United States Patent [19]
Dao et al.

[11] Patent Number: 5,581,034
[45] Date of Patent: Dec. 3, 1996

[54] CONVECTIVE ACCELEROMETER AND INCLINOMETER

[75] Inventors: Ricardo Dao; Denny E. Morgan; Harold H. Kries; David M. Bachelder, all of San Diego, Calif.

[73] Assignee: REMEC, Inc., San Diego, Calif.

[21] Appl. No.: 372,760

[22] Filed: Jan. 13, 1995

[51] Int. Cl.⁶ .................................................. G01P 15/08
[52] U.S. Cl. ................................. 73/514.09; 33/366
[58] Field of Search ..................... 73/514.09, 514.03, 73/504.05, 504.06, 504.07, 654; 33/366

[56] References Cited

U.S. PATENT DOCUMENTS

| | | | |
|---|---|---|---|
| 2,440,189 | 4/1948 | Zworykin | 73/514.09 |
| 2,455,394 | 12/1948 | Webber | 73/514.09 |
| 3,084,557 | 4/1963 | Von Ahlefeldt | 73/514.09 |
| 3,241,374 | 3/1966 | Menkis | 73/514.09 |
| 3,500,691 | 3/1970 | Moore | 73/504.06 |
| 3,664,196 | 5/1972 | Codina . | |
| 3,967,178 | 6/1976 | Morris | 73/514.03 |
| 4,522,062 | 6/1985 | Peters . | |
| 4,726,227 | 2/1988 | Moffatt et al. | 73/504.06 |
| 4,797,661 | 1/1989 | Wiley . | |
| 4,823,461 | 4/1989 | Takahashi et al. | 73/504.06 |
| 4,930,349 | 6/1990 | Takahashi et al. | 73/504.06 |
| 4,951,507 | 8/1990 | Takahashi et al. | 73/504.06 |
| 5,012,676 | 5/1991 | Takahashi et al. | 73/504.06 |
| 5,193,392 | 3/1993 | Besson et al. . | |
| 5,235,237 | 8/1993 | Leonhardt . | |
| 5,243,861 | 9/1993 | Kloeck et al. . | |
| 5,277,064 | 1/1994 | Knigga et al. . | |
| 5,303,589 | 4/1994 | Reidmeister et al. . | |

FOREIGN PATENT DOCUMENTS

| | | |
|---|---|---|
| 0664456 | 7/1995 | European Pat. Off. . |
| 0674182 | 9/1995 | European Pat. Off. . |

*Primary Examiner*—John E. Chapman
*Attorney, Agent, or Firm*—Burns, Doane, Swecker & Mathis, L.L.P.

[57] ABSTRACT

A convective accelerometer and inclinometer includes two temperature sensing elements mounted within a sealed enclosure containing a gas. The application of heat to the gas within the enclosure by a heating element causes the gas to flow in a predetermined pattern in free convection. When linear acceleration or inclination is applied to the enclosure the convective flow of gas is affected causing a temperature differential between the temperature sensing elements. This temperature differential is measured as a difference in electrical resistance between the two temperature sensing elements which is proportional to the acceleration. The device can be used to measure linear acceleration, velocity, position or inclination. The device can also be used as an inclinometer for measuring the angle of gravity. The device has a wide variety applications particularly within the automotive field.

22 Claims, 6 Drawing Sheets

CONVECTIVE ACCELEROMETER AND INCLINOMETER

BACKGROUND OF THE INVENTION

1. Field of the Invention

The present-invention relates to a fluid based accelerometer and inclinometer, and more particularly to a transducer which determines acceleration, inclination, position or velocity based on a temperature differential caused by the effect of acceleration on free or natural convection.

2. Description of the Related Art

Accelerometers and inclinometers of various types have been used in many different applications including robotics, transportation, consumer electronics and toys. A variety of mechanical, and electrical devices are available for measuring acceleration and inclination including piezoelectric, piezoresistive, force balanced and capacitive accelerometers. However, it is desirable to provide a highly sensitive accelerometer having a smaller size and lower cost than is available in these known accelerometers.

Piezoelectric accelerometers include a piezoelectric or crystalline material which generates an emf in response to acceleration. Piezoelectric accelerometers are used primarily in the measurement of vibration and are generally not capable of measuring constant acceleration. Examples of piezoelectric accelerometers are disclosed in U.S. Pat. Nos. 5,235,237 and 5,193,392.

Piezoresistive accelerometers include mechanical structures which generate strain in critical locations due to acceleration. The acceleration is measured by placing piezoresistors in the locations where strain occurs to generate electric signals corresponding to the acceleration. Piezoresistive accelerometers are capable of measuring constant accelerations at high accelerations, at a moderate cost. However, piezoresistive accelerometers have the disadvantage that they can be used only in a limited temperature range and are sensitive to changes in environmental temperature. An example of a piezoresistive accelerometer is disclosed in U.S. Pat. No. 5,277,064.

In a force balanced or servo accelerometer a mass is spring-suspended between two permanent magnets. A displacement of the mass due to acceleration is sensed by a capacitive or other probe. A signal from that probe is amplified and the resulting current passes through a coil wound on the mass, producing a rebalancing force that restores the mass to its original position. Force balanced or servo accelerometers provide high sensitivity and precision, but at a very high cost. An example of a servo accelerometer is disclosed in U.S. Pat. No. 3,664,196.

Capacitive accelerometers include parallel plates which move closer together in response to acceleration. The capacitance between the parallel plates can be measured with electronics. A capacitive accelerometer can be made in a relatively small size. However, as the capacitive accelerometer is made smaller, the size of the electronics required to sense and measure the small output increases. Therefore, the overall size and cost of the capacitive accelerometer is about the same as that of the piezoresistive accelerometers. Examples of capacitive accelerometers are disclosed in U.S. Pat. Nos. 5,303,589 and 5,243,861.

Accelerometers which are also capable of measuring inclination or static position are called inclinometers. An inclinometer measures the angle of the force of gravity on an object to determine its position relative to the earth. Inclinometers such as the one disclosed in U.S. Pat. No. 5,092,171, measure inclination by measuring the angle of the surface of a fluid with respect to the container for the fluid.

Another type of fluid based measuring device is an angular rate sensor which measures angular rate change, rather than measuring acceleration. The operating principle of the fluidic angular rate sensor is that a gas jetted from a nozzle is biased in the direction opposite the direction of acceleration. In the fluidic angular rate sensor a pair of sensing wires are positioned so that the jet of gas equally contacts both wires when the device is stationary. If an angular rate change occurs, the gas jet is biased to one direction so that one of the sensing wires is cooled more than the other. The difference in the resistances of the two sensing wires is measured to determine the angular rate change. This type of angular rate sensor has the disadvantage that a pump is required to create the gas jet, making the device relatively large and expensive. Examples of such angular rate sensors are shown in U.S. Pat. Nos. 3,500,691, 4,951,507 and 5,012,676.

OBJECTS AND SUMMARY OF THE INVENTION

The present invention overcomes the disadvantages of the above acceleration and inclination measuring devices by providing an accelerometer and/or an inclinometer which is compact, lightweight, inexpensive to manufacture and sensitive to small accelerations.

The accelerometer according to one aspect of the invention includes an enclosure containing a fluid, a heating means for locally heating the fluid in the enclosure and at least one temperature sensing element positioned within the enclosure such that the fluid moves across the sensing element by virtue of free convection. A circuit means is connected to the temperature sensing element for determining acceleration, position, velocity or inclination from the effect of acceleration on free convection within the enclosure.

The invention also relates to a method for measuring acceleration or inclination including provision of an enclosure containing a fluid, at least one temperature sensing element and a heating means. The fluid within the enclosure is heated by the heating means. The enclosure is then subjected to an acceleration or inclination and this acceleration or inclination is determined by measuring a difference in the temperature of the temperature sensing element caused by the effect of acceleration or inclination on free convection within the enclosure.

BRIEF DESCRIPTION OF THE DRAWING FIGURES

The invention will be described in detail with reference to the accompanying drawings in which like elements bear like reference numerals and wherein.

DETAILED DESCRIPTION OF THE INVENTION

Figure 1:
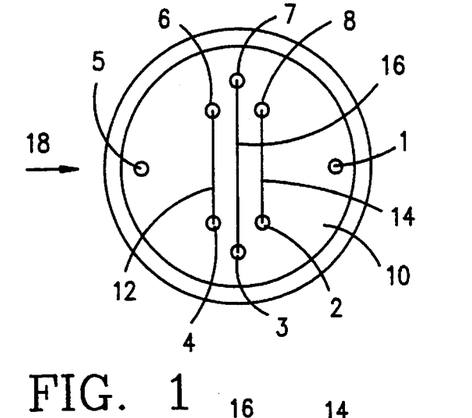
FIG. 1 is a top view of a first embodiment of a device for determining acceleration in accordance with the present invention.
Figure 2:
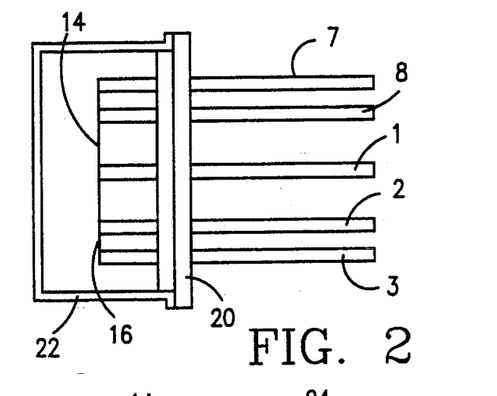
FIG. 2 is a side view of the device of FIG. 1.

FIGS. 1 and 2 show one embodiment of an accelerometer according to the present invention including a hermetically sealed enclosure 10 containing a gas, two temperature sensing elements 12,14 positioned within the enclosure and a heating element 16 positioned between the temperature sensing elements. Although the invention is described herein as an accelerometer it should be understood that the device may be used to measure acceleration, velocity, position or inclination. In addition, two or more such accelerometers may be used in combination to more precisely measure angular acceleration or angular velocity.

In the embodiment of the invention shown in FIGS. 1 and 2, the enclosure 10 includes a header assembly 20 which is provided with a plurality of posts 1–8 extending through the header assembly for use as electrical contacts. As shown in FIG. 1, four of the posts 2,4,6,8 serve as mounting means for the temperature sensing elements 12,14, and two of the posts 3,7 serve as mounting means for the heating element 16. The remaining two posts 1,5 are used to provide a ground. The ground posts 1,5 also provide additional mechanical support for the device. The posts 1–8 are positioned within the header assembly 20 in a symmetrical configuration so that heating of the temperature sensing elements occurs symmetrically.

The enclosure 10 is filled with a fluid and provided with a cover 22, which is configured to engage the header assembly 20 with a tight fit and is hermetically sealed to the header assembly to prevent any of the fluid from escaping. The hermetic seal may be formed by any known technique for forming a leak proof seal including eutectic soldering, projection welding, laser welding, resistance welding or cold welding. The enclosure 10 is Kovar, however, other materials such as glass, plastic, ceramic or other glass to metal sealing alloys also may be used. Suitable parts for the header assembly 20 and the cover 22 of the present invention are AIRPAX A08-616-002 and REMEC A500200-330, respectively.

Although a separate header assembly 20 and cover 22 are shown in the figures, the enclosure can be formed as a single piece such as a glass bulb containing filaments. Alternatively, a ceramic surface mount package may be used which will be particularly useful for very small applications.

The present invention provides a sealed chamber for containing the fluid and protecting the fluid from outside forces or disturbances so that the fluid is free to move only by natural convection and not by forced convection due to outside sources. The natural convection within the enclosure is altered or changed only by movement of the entire enclosure, thus providing the acceleration sensing. Free or natural convection is the transfer of heat by the flow of a fluid subject to a heat source. A fluid which is subject to a heat source will flow in a predictable convective flow pattern. This convective flow pattern is affected by acceleration and this effect of acceleration on the convective flow pattern can be measured to determine the acceleration of the enclosure.

When the heating element 16 of the embodiment of FIGS. 1 and 2 is provided with electric current, the resistance in the element causes the temperature of the element to rise. The fluid within the enclosure 10 which is adjacent to the heating element 16 is heated by the hot element and rises within the enclosure due to the buoyant forces of heated and thereby lower density fluid. The flow pattern of a fluid in free convection in a stationary system is shown in FIG. 13.

Figure 13:
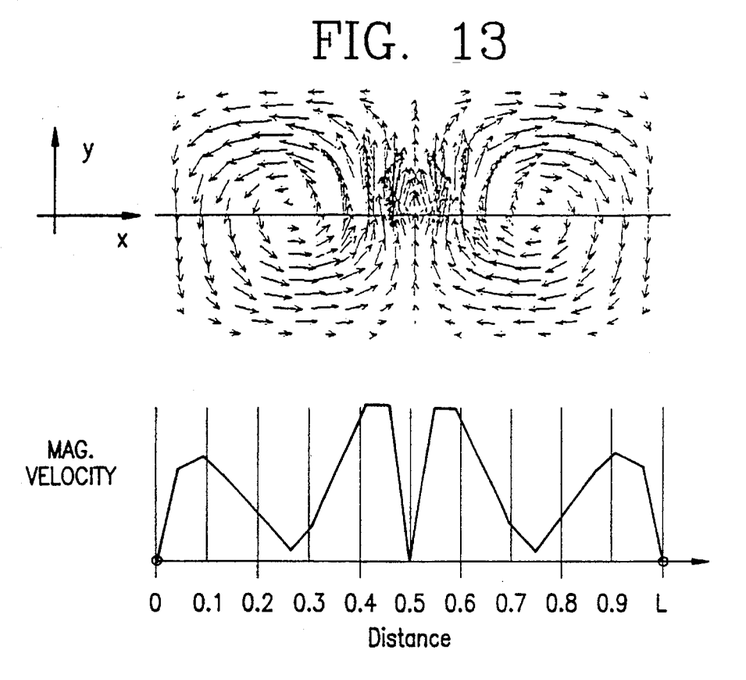
FIG. 13 is a fluid flow model of the fluid flow from buoyant forces in a stationary system subject to a downward gravitational force along the Y direction alone.

The source of heat in the model of FIG. 13 is a hot wire in the center of the figure which extends into the paper. In the flow pattern shown in FIG. 13, the fluid heated by the heat source expands and rises to the top of the enclosure. The cooler and thereby more dense fluid falls to the bottom of the enclosure due to the force of gravity. As can be seen from FIG. 13, the flow pattern of the fluid is symmetrical about a vertical plane through the heat source. The lower part of FIG. 13 shows the magnitude of the velocity of the fluid as a function of the normalized distance along the X axis.

Figure 14:
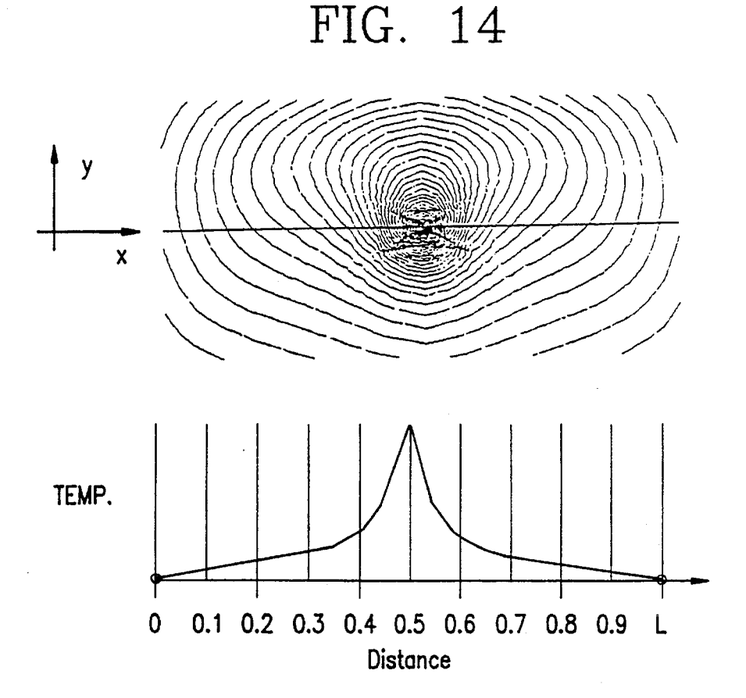
FIG. 14 is a temperature contour model of the stationary system of FIG. 13.

FIG. 14 shows the temperature profile for the flow pattern of the stationary system of FIG. 13, with the contour lines for the higher temperatures being in the center adjacent the heat source. The shape of the temperature contours is caused by the force of gravity on the fluid. The lower part of FIG. 14 shows the temperature of the fluid as a function of the distance along the X axis. As can be seen in FIG. 14, the temperature profile of a fluid in free convection in a stationary system is symmetrical about the vertical plane through the heat source. Therefore, temperature sensing elements 12,14 which are positioned symmetrically about the vertical plane through the heat source will register the same temperature when the accelerometer is not subject to acceleration.

Figure 15:
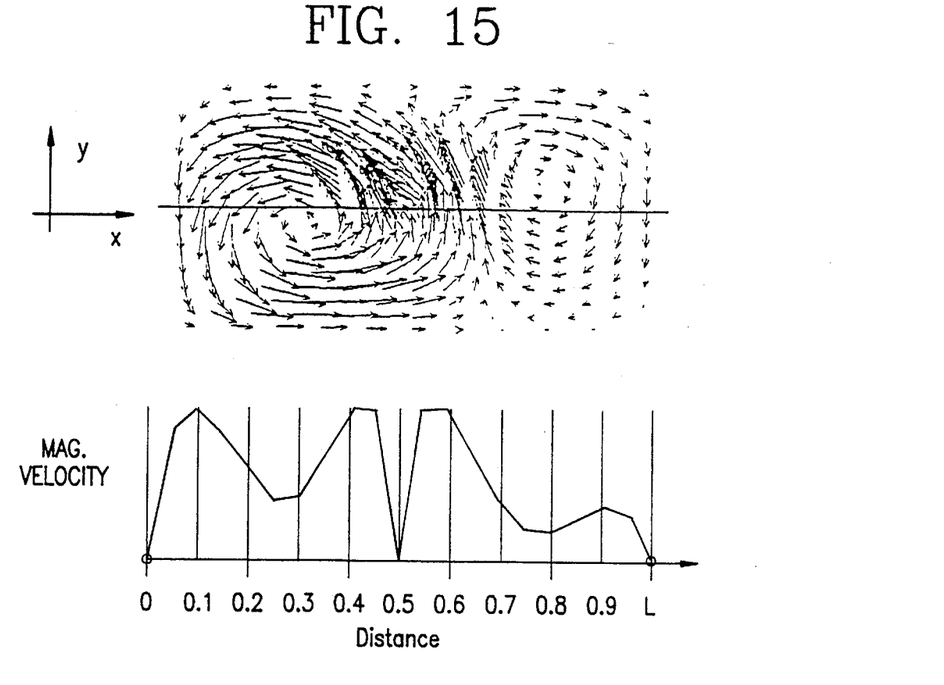
FIG. 15 is a fluid flow model of the fluid flow in a system which is accelerated at 1 g in the X direction in addition to the downward gravitational force along the Y direction.

When the accelerometer is subject to acceleration the convective flow pattern of the gas within the enclosure 10 changes. FIG. 15 shows the convective flow pattern of a fluid which is subject to gravity and an acceleration of 1 g applied in the X direction, to the right in the figure. The convective flow of the fluid is distorted due to the acceleration so that more of the fluid heated by the heat source flows to the left in FIG. 15. The lower part of FIG. 15 shows the magnitude of the velocity of the fluid as a function of the normalized distance along the X axis.

Figure 16:
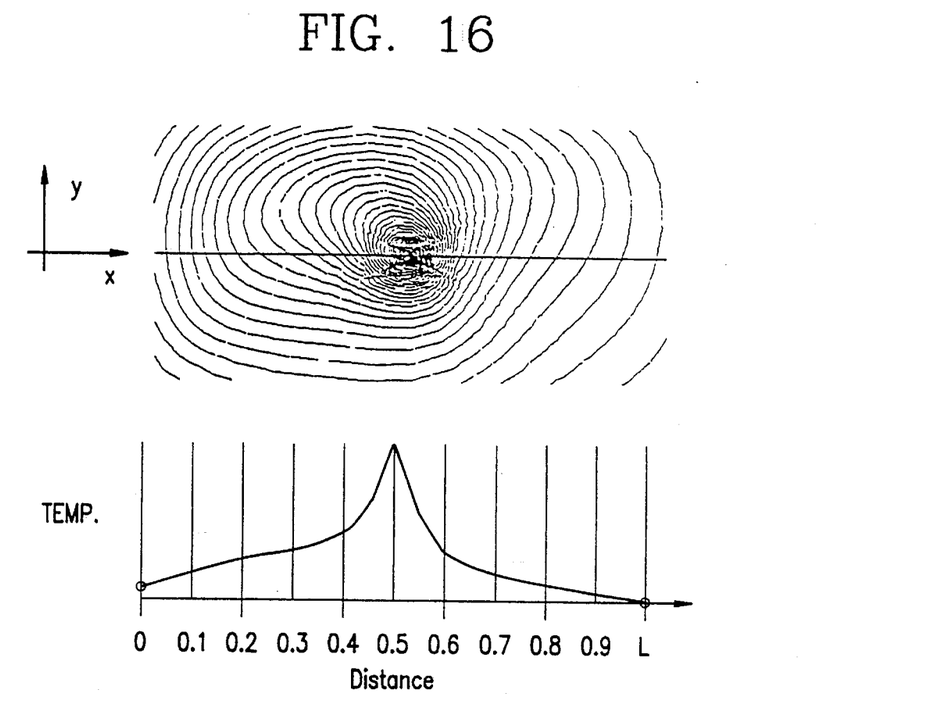
FIG. 16 is a temperature contour model of the accelerating system of FIG. 15.

FIG. 16 shows the temperature profile of the accelerating system shown in FIG. 15. The shapes of the temperature contours in FIG. 16 are skewed due to the acceleration and are asymmetrical about the vertical axis through the heat source. Therefore, temperature sensing elements 12,14 which are positioned symmetrically about the vertical plane through the heat source will lie within different temperature contours. The temperature difference between the temperature sensing elements 12,14 depends upon the acceleration. Although the examples shown include the effects of the force of gravity, it should be understood that the device is sensitive to acceleration even in the absence of gravitational force.

The accelerometer of FIGS. 1 and 2 has an acceleration sensitive axis which is generally perpendicular to and in the same plane as the temperature sensing elements 12,14. When the accelerometer is accelerated along the acceleration sensitive axis, in the direction of the arrow 18, the convective flow of the fluid within the enclosure 10 is affected as described above with reference to FIGS. 15 and 16. The pattern of convection is skewed due to the acceleration so that the amount of heat transfer to the first temperature sensing element 12 is increased and the amount of heat transfer to the second temperature sensing element 14 is decreased.

Figure 4:
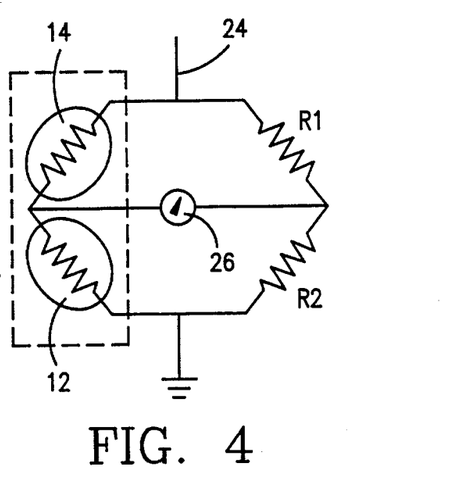
FIG. 4 is a circuit diagram of a resistance determining circuit according to one embodiment of the present invention.

Therefore, when the accelerometer of FIG. 1 is subject to acceleration in the direction of the arrow 18, the temperature of the temperature sensing element 12 will be higher than the temperature of the temperature sensing element 14. This difference in temperature between the first and second temperature sensing elements is measured to determine the acceleration. Since changes in temperature cause corresponding changes in electrical resistance, the temperature difference between the sensing elements can be easily measured by an electrical circuit such as a Wheatstone bridge (FIG. 4).

Accelerations in all directions other than 90° to the acceleration sensitive axis will have a component along the acceleration sensitive axis which can be measured by the present invention. An acceleration which is applied at 90° to the acceleration sensitive axis will cause an equal change in temperature for each of the two temperature sensing elements 12,14. Therefore, the difference in temperature between the temperature sensing elements 12,14 will be zero for acceleration at 90° to the acceleration sensitive axis. Therefore, more than one accelerometer may be provided and positioned perpendicularly in order to sense accelerations in two or more directions.

The temperature sensing elements 12,14 are preferably positioned near the center of the enclosure 10 at approximately an equal distance from the cover 22 and the header assembly 20 in order to minimize the effects of external temperature changes on the internal temperature of the fluid and the elements. The temperature sensing elements 12,14 are preferably positioned at a sufficient distance from the walls of the cover 22, and the header assembly 20 so that appreciable heat is not lost to the enclosure before the fluid flow reaches the sensor elements. Preferably, the distance between the temperature sensing elements and the enclosure is at least as great as the distance between the temperature sensing elements 12,14 and the heating element 16.

Additional containing of the enclosure 10 can also be provided to isolate the fluid and the temperature sensing elements from localized external temperature changes. Temperature isolation may be achieved by providing a second enclosure or casing surrounding the enclosure 10. A fluid such as air provided between the enclosure 10 and the second enclosure or casing would minimize uneven heating or cooling of the enclosure 10. Alternatively, a heat sink may be provided, for example, on the header assembly 20, and the remainder of the enclosure may be insulated. The combination of a heat sink and insulation will effectively isolate the enclosure from the effects of localized external temperature changes. Another alternative for isolating the enclosure from localized external temperature changes is to isolate the enclosure entirely from the environment by placing the device in a temperature control oven or by attaching a thermistor temperature regulator to the enclosure.

The temperature sensing elements 12,14 are preferably of a sufficient length and a small enough diameter so that free convection within the enclosure prevails over conduction of heat through the posts 2,4,6,8. Temperature sensing elements having high aspect ratios (length/diameter) are desirable to assure that heat transfer by convection prevails over heat transfer by conduction of heat through the mounting posts. For example, nickel or tungsten temperature sensing elements of 0.3 inches in length and 0.0003 inches in diameter are acceptable.

The temperature sensing elements 12,14, are preferably made of a metal having a relatively high temperature coefficient of resistivity because such metals provide higher sensitivity. Linear temperature coefficients of resistivity in the range of −55° C. to 200° C. are desirable for the temperature sensing elements. Suitable metals for the temperature sensing elements include nickel, platinum and tungsten. However, it should be understood that other pure metals and alloys having similar characteristics can also be used.

The heating element 16 is preferably formed of the same material as the temperature sensing elements, however, it may also be formed of a different material than the temperature sensing elements 12,14. For example, the heating element may be formed of a material with a higher resistance than the temperature sensing elements. Metal heating elements similar to those metals used for the temperature sensing elements with relatively high temperature coefficients of resistivity are desirable because they provide a self compensation of scale factor verse temperature when used as in FIG. 5.

The heating element 16, as shown in FIGS. 1 is preferably located symmetrically at an equal distance from both of the temperature sensing elements 12,14 so that when the accelerometer is not subject to acceleration or inclination heating of the two temperature sensing sensor elements due to convection is equal. An asymmetrically located heating configuration may also be used, however, the output of such an asymmetrically located heated configuration accelerometer will have an offset that changes versus environmental temperature. In addition, the heating of the fluid may be provided by an element other than a wire such as a point source or a coil. Alternatively, two or more heating elements may be used.

The location of the temperature sensing elements 12,14 with respect to the heating element 16 will affect the frequency response of the accelerometer, i.e., the speed at which the device registers a change in acceleration. Where a higher frequency response is necessary, the temperature sensing elements 12,14 may be moved closer to the heating element 16 to provide quicker convection of heat from the heating element to the temperature sensing elements. Element spacing, layout, geometry and position are used to control the temperature of the elements, and therefore, the output of the accelerometer.

Figure 6:
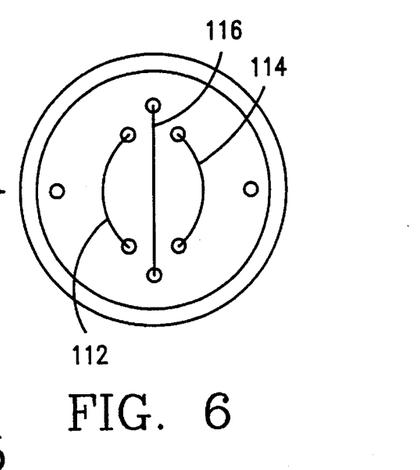
FIG. 6 is a top view of a second embodiment of the present invention.

The temperature sensing elements 12,14 are shown in FIGS. 1 and 2 as linear wires which are positioned parallel to each other within the enclosure. However, other shapes and variations of the temperature sensing elements are within the scope of the present invention. For example, the elements may be shaped to yield different transfer functions for simplicity of use in various applications. Particularly, curved or arc shaped sensing elements 112,114 as shown in FIG. 6, may better conform the accelerometer output to a linear mathematical function which provides for simplicity of interface. Additionally, coiled temperature sensing elements may be used in place of linear wires.

The frequency response of the accelerometer is also effected by the molecular weight of the gas within the enclosure 10. Gases which have higher molecular weights, such as nitrogen, argon, xenon, neon or krypton and mixtures of these are preferred for some applications because they provide for greater temperature difference from the heating element 16 to the temperature sensing elements 12,14 for the same heat input power. Helium, which has a lower molecular weight than the gases listed above, will increase the frequency response of the accelerometer by an order of magnitude over the frequency response of an accelerometer using nitrogen. However, the low molecular weight of helium will make an accelerometer more sensitive to localized temperature changes in the environment surrounding the exterior of the enclosure and will require more heater power. There is a trade-off between frequency response and sensitivity to localized environmental temperature changes, and there is also a trade-off between frequency response and heater power required. Therefore, the helium accelerometer is useful in applications where locally uniform environmental temperatures prevail and high frequency response is needed.

Although liquids may be used in the present invention, it is expected that they will have a relatively slow frequency response, poor sensitivity and require a large amount of heater power. The choice of a particular inert gas or mixture of gases will depend on the frequency response and sensitivity required, and the power available for a particular application. The use of inert gases is preferred over non-inert gases because non-inert gases may cause the temperature sensing and heating elements to break down or age more quickly.

The frequency response characteristics of the accelerometer output may also be varied by varying the pressure of the gas within the enclosure. When the pressure within the enclosure is varied, the accelerometer will exhibit a different frequency response, however, as has already been described, there will be a trade-off between the frequency response, the sensitivity of the accelerometer to external localized temperature changes and heater input power.

The accelerometer according to the present invention acts as an inclinometer in the same manner as described above with respect to acceleration. The force of gravity acts as acceleration on the enclosure 10 and causes changes in fluid flow due to inclination of the enclosure in the direction of the acceleration sensitive axis. As shown in FIG. 14, the temperature contours of a stationary system are non-circular in shape due to the acceleration force of gravity. Therefore, when the accelerometer is inclined, the two temperature sensing elements which are positioned symmetrically about the heat source will fall within different temperature contours. The temperature differential between the temperature sensing elements caused by inclination depends upon the degree of inclination.

Velocity and position can also be calculated mathematically from the acceleration or inclination data outputted by the present invention. Thus, the present invention can be used to measure acceleration, inclination, position or velocity.

Figure 3:
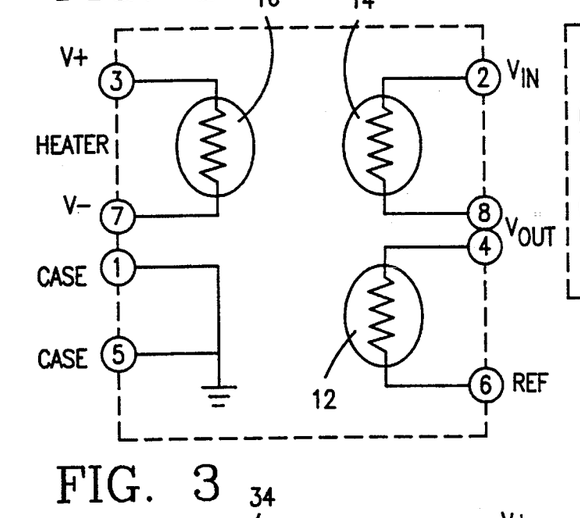
FIG. 3 is an electrical diagram of the device of FIG. 1.

FIG. 3 is an electrical diagram of the internal wiring of the accelerometer of FIGS. 1 and 2. FIG. 3 shows the two posts 3,7, on which the heating element 16 is mounted, connected to a power source. The two ground posts 1,5 allow the header assembly 20 of the enclosure 10 to be used as a ground for electrical noise reduction. The posts 2,4,6,8 provide external electrical connections for connecting the temperature sensing elements 12,14 to a circuit or circuits for determining the linear acceleration or inclination such as the circuit shown in FIG. 4.

FIG. 4 is an electrical diagram of a circuit which may be used to determine the difference in temperature between the two temperature sensing elements 12,14. The circuit of FIG. 4 determines the difference in the resistances of the two temperature sensing elements by a Wheatstone bridge. The bridge includes a power lead 24, two known resistances R1,R2, and a voltage meter 26 which measures the voltage output $V_{out}$. In operation, electrical power is supplied from the power lead 24 through the temperature sensing elements 12,14 and also through the two known resistors R1,R2. The voltage difference across the Wheatstone bridge from between the two temperature sensing elements 12,14 to between the two known resistors R1,R2 is measured by the voltage meter 26. The output of the voltage meter 26 depends upon the acceleration of the device. The circuit of FIG. 4 may be positioned either inside or outside of the enclosure.

Figure 5:
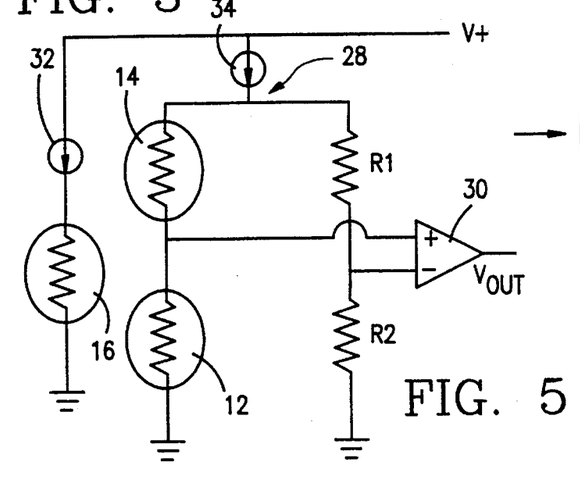
FIG. 5 is a circuit diagram of a heating and resistance determining circuit according to another embodiment of the present invention.

FIG. 5 shows a circuit diagram of an alternative embodiment of a circuit for both heating the heating element 16 and determining the difference in temperature of the two temperature sensing elements 12,14. According to the circuit shown in FIG. 5, a first constant current source 32 is applied to the heating element 16, and a second constant current source 34 is applied to the Wheatstone bridge circuit 28. The Wheatstone bridge circuit 28 includes the two temperature sensing elements 12,14 arranged in series, and two known resistors R1 and R2 arranged in series. The voltage difference across the Wheatstone bridge is determined by a differential amplifier 30 as opposed to the voltage meter described above with respect to FIG. 4. The use of constant current sources 32,34 in this embodiment of the invention improves the accuracy of the device by minimizing scale factor shift due to environmental temperature changes. The constant current sources 32,34 may be located within the enclosure 10. The circuit of FIG. 5 works best when the heater element resistance is temperature sensitive.

Figure 7:
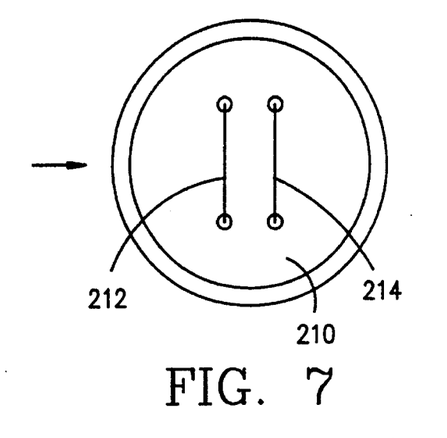
FIG. 7 is a top view of a third embodiment of the present invention.
Figure 8:
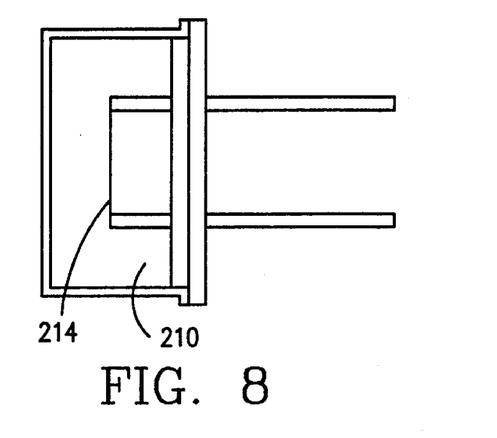
FIG. 8 is a side view of the device of FIG. 7.

Another embodiment of the present invention is the two wire embodiment in which the separate heating element is eliminated and the temperature sensing elements themselves are used as the source of heat. FIGS. 7 and 8 show the two wire embodiment in which the heating of the temperature sensing elements 212,214 is provided by mutual and self heating due to the resistance within the temperature sensing elements themselves. In this embodiment, the heat from the temperature sensing elements is dissipated from the elements by free convection in different convection patterns depending on the acceleration or inclination of the enclosure 210. The same amount of heat is preferably applied to each of the temperature sensing elements 212,214 so that the difference in temperature between the two temperature sensing elements is due only to the change in the convective fluid flow and not due to uneven heat application.

In the two wire embodiment of the invention, heat is applied symmetrically to the two temperature sensing elements 212,214 by mutual and self heating. When the two wire accelerometer is subject to acceleration, the heat dissipates from the two temperature sensing elements differently depending on the convective flow patterns of the gas surrounding each of the sensing elements. The temperature difference between the sensing elements is then measured with a circuit such as those shown in FIGS. 4 and 5 in the same manner as the three wire embodiment discussed above. The preferred configurations and materials discussed above with respect to the three wire embodiment are also applicable to the two wire embodiment. The two wire embodiment employs an electrical circuit for determining acceleration such as the circuit shown in FIG. 4.

An alternative two wire embodiment employs one temperature sensing element and one heating element. The accelerometer according to this embodiment may be used to detect changes in acceleration, velocity, position or inclination. However, because this embodiment has only one temperature sensing element it lacks the ability to offset environmental temperature changes by measuring a difference between the temperatures of two temperature sensing elements. Therefore, this alternative two wire embodiment is useful in applications in which a sensor is needed to sense changes in acceleration or inclination or where the environmental temperature is relatively constant. Alternatively, two such two wire accelerometers could be used in opposite orientations in a bridge circuit to provide cancellation of temperature changes. The two wire embodiments of the present invention can be implemented with a dual filament light bulb connected to the appropriate circuitry.

Figure 9:
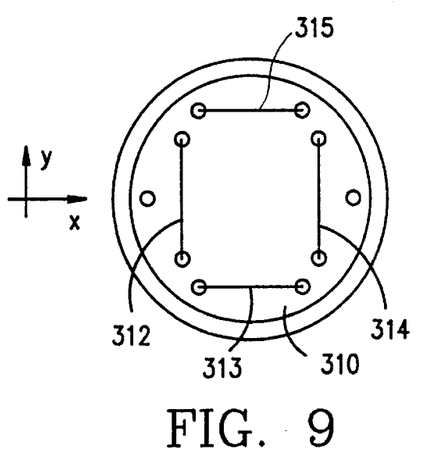
FIG. 9 is a top view of a fourth embodiment of the present invention.
Figure 10:
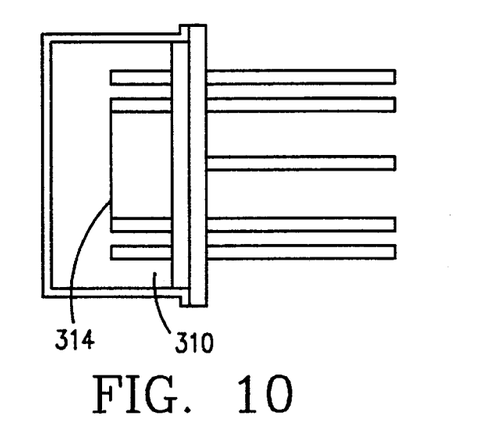
FIG. 10 is a side view of the device of FIG. 9.

Another embodiment of the invention, shown in FIGS. 9 and 10, is configured to sense acceleration or inclination in two dimensions. This embodiment is provided with four temperature sensing elements 312,313,314,315 for sensing acceleration along two acceleration sensitive axes, the X and Y axes. The heating of the temperature elements is provided by mutual and self heating of the elements. Alternatively, this four wire embodiment may be provided with a separate heating element positioned centrally within the enclosure 310. This four wire accelerometer of FIGS. 9 and 10 provides the same result as mounting two of the accelerometers shown in FIGS. 7 and 8 at right angles to each other.

Figure 11:
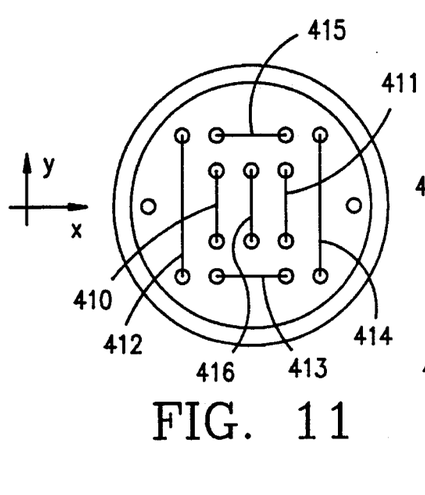
FIG. 11 is a top view of a fifth embodiment of the present invention.
Figure 12:
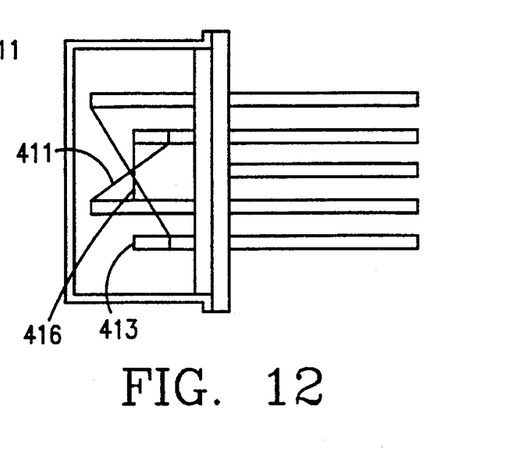
FIG. 12 is a side view of the device of FIG. 11.

FIGS. 11 and 12 show an additional embodiment of the present invention which can sense acceleration in any direction. This embodiment includes six temperature sensing elements 410–415 positioned in pairs on opposite sides of a centrally located heating element 416. As shown in FIGS. 11 and 12, a first pair of temperature sensing elements 410, 411 are provided at an angle to the heating element 416. A second pair of temperature sensing elements 412,414 are positioned at 90 degrees to the first pair of elements 410,411. The third pair of temperature sensing elements 413,415 are positioned perpendicular to and in the same plane as the heating element 416. This configuration provides the same result as three of the accelerometers shown in FIGS. 1 and 2, which are mounted at right angles to one another.

The output signal $V_{out}$ of any of the above described embodiments of the present invention may require output signal conditioning to interface with and enhance the performance of the accelerometer for a particular application. Interface signal conditioning can be used to amplify or diminish the accelerometer output to a voltage required by the particular application electronics. When the accelerometer according to the embodiment of FIGS. 1–4 of the invention, using nitrogen at 1 atm., is accelerated at a rate of about 1 g and is provided with an input voltage of about 4 volts at 25° C., the output, $V_{out}$, detected by the voltage meter 26 is about 40 millivolts. Depending on the particular application, an output of 40 millivolts may be insufficient and require amplification by an electronic amplifier or other scale factor circuitry. The 40 millivolt output of the example above described may be amplified to typically between 1 and 10 volts depending on the application.

Figure 21:
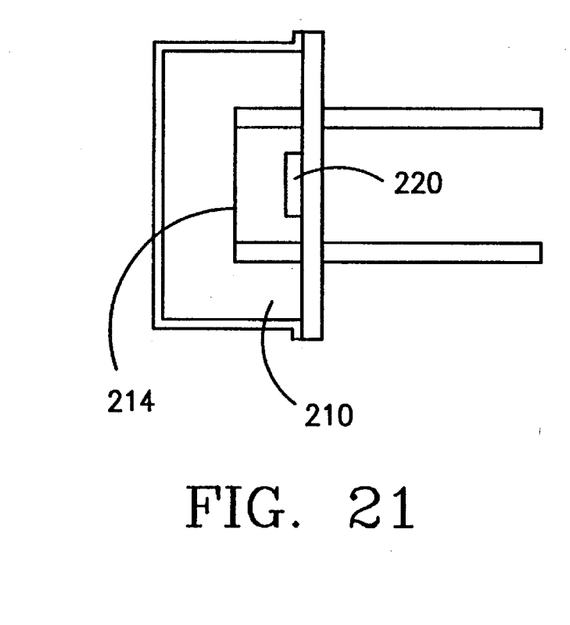
FIG. 21 is a side view of the device of FIG. 7 including a constant temperature heater.

Signal conditioning may also be used to improve the temperature stability of the accelerometer by compensating for environmental temperature changes. Various temperature compensation circuits are known to those in the art and would be acceptable for compensating for environmental temperature changes in the present invention. An alternate method for reducing the accelerometer sensitivity to external temperature is to employ a constant temperature heater 220, as shown in FIG. 21. The constant temperature heater 220 may be located, either external to the accelerometer enclosure 10 or within the accelerometer enclosure itself. The heater keeps the enclosure at a constant temperature and thereby minimizes the effect of environmental temperature changes.

Frequency response compensation circuits may also be used depending on the application, to extend the frequency response of the accelerometer. For example, the frequency response of a nitrogen accelerometer may be extended to the frequency response of a helium accelerometer by a frequency response compensation circuit. An example of a frequency compensation circuit is shown in FIG. 17.

Figure 17:
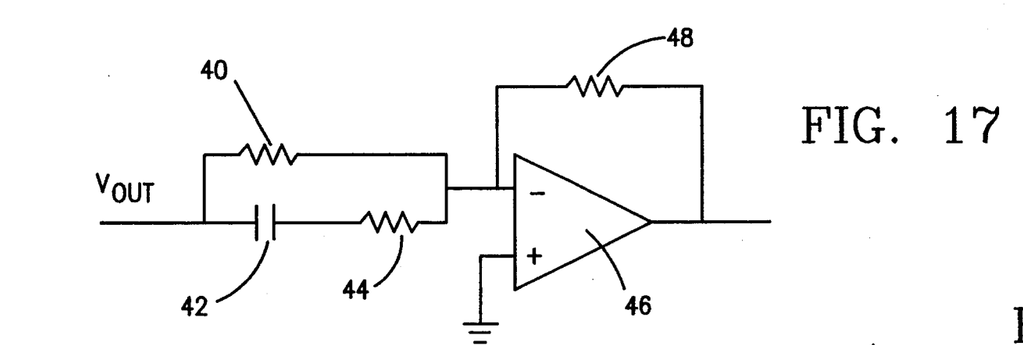
FIG. 17 is a circuit diagram of a frequency compensation circuit according to the present invention.

As shown in FIG. 17, the output of the accelerometer $V_{out}$ is inputted into the frequency compensation circuit which modifies the output to provide a faster response. The frequency compensation circuit of FIG. 17 includes a first resistor 40 connected in parallel with a capacitor 42 and a second resistor 44 which are connected in series. The output of the resistors and capacitor is connected to the negative terminal of an op amp 46. The positive terminal of the op amp 46 is connected to ground. The output of the op amp 46 provides the output of the circuit and is connected through a third resistor 48 back to the negative input terminal of the op amp.

The specific components of the frequency compensation circuit will vary depending on the amount of compensation required. However, one possible combination according to the present invention includes two 320 k$\Omega$ resistors for the first and third resistors 40,48, a 330 $\Omega$ resistor for the second resistor 44, a 0.1E-6 F capacitor 42 and an LM124 op amp 46.

Figure 18:
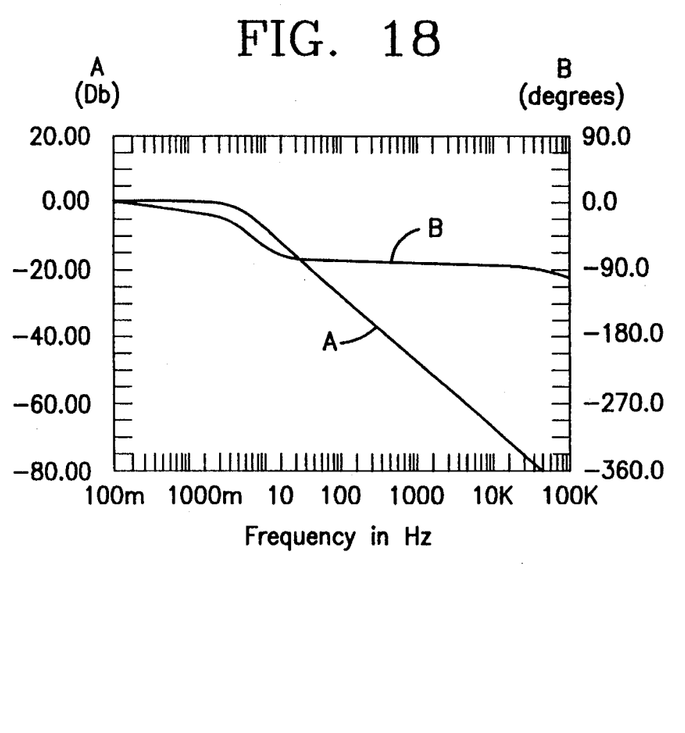
FIG. 18 is a simulated frequency response of the accelerometer.
Figure 19:
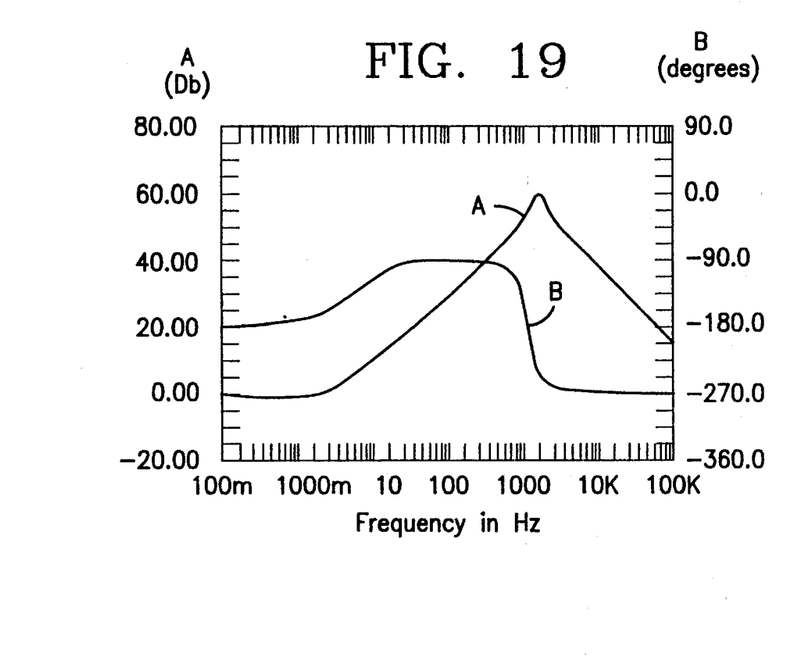
FIG. 19 is a simulated frequency response of the frequency compensation circuit of FIG. 17 alone.
Figure 20:
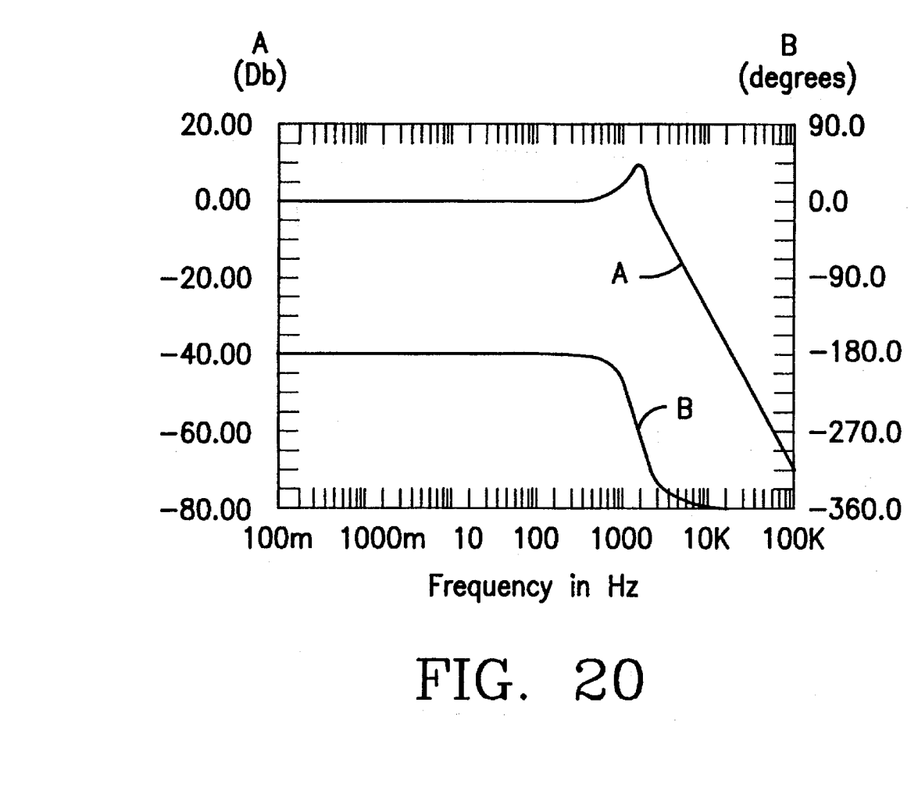
FIG. 20 is a simulated frequency response of the accelerometer and the frequency compensation circuit of FIG. 17.

The effect of the frequency compensation circuit of FIG. 17 is shown in FIGS. 18–20, where plot A represents the amplitude shown in the left hand scale in decibels and plot B represent the phase shown in the right hand scale in degrees. FIG. 18, shows a simulated frequency response of an accelerometer of the present invention. Note that for this particular model the amplitude attenuation starts at about 1 Hz. FIG. 19 shows the amplitude and phase of the frequency compensation circuit of FIG. 17. Note that the circuit amplitude starts to increase at about 1 Hz.

FIG. 20 shows the simulated frequency response of the simulated accelerometer and the frequency compensation circuit of FIG. 17 together. As can be seen from FIG. 20, the amplitude remains constant up to about 1 kHz.

The package size of the accelerometer according to all of the forgoing embodiments can be as small as current miniature electronic component packages, such as, surface mount components. The present invention can be made small enough for use in a wide variety of applications including but not limited to industrial machinery automotive control, marine stabilization, navigation, consumer electronics and amusement devices. The applications for accelerometers in the automotive field alone include navigation such as global positioning systems, suspensions, air cushion restraint systems, anti-lock breaking systems, automobile testing and automobile instrumentation.

Although the invention has been described as including an enclosure, the enclosure is not necessary for the device to operate. The purpose of the enclosure in the present invention is to prevent exposure of the temperature sensing elements to forced convection from external sources and to provide an inert atmosphere to minimize aging of the temperature sensing and heating elements. Forced convection from an external source such as air flow due to accelerometer movement would distort the fluid flow patterns of free convection discussed above with reference to FIGS. 13 and 15. Therefore, the enclosure can take a variety of forms. A non-hermetically sealed or vented enclosure may be used to protect the temperature sensing elements from forced convection when the fluid within the enclosure is air. Further the enclosure can even be omitted when the device is used in a still air environment such as in a larger enclosure which contains a grouping of electronics.

While the invention has been described in detail with reference to specific embodiments thereof, it will be apparent to one skilled in the art that various changes and modification can be made, and equivalents employed, without departing from the spirit and scope of the invention.

I claim:

1. A device for sensing acceleration, position, velocity or inclination comprising:

an enclosure containing a fluid;

heating means for heating the fluid in the enclosure;

two substantially parallel temperature sensing elements positioned within said enclosure such that the fluid moves across the two temperature sensing elements in free convection; and circuit means connected to the two temperature sensing elements for determining acceleration, position, velocity or inclination based on the effect of acceleration on the free convective flow within the enclosure;

wherein the heating means is provided by the two temperature sensing elements.

2. The device of claim 1, wherein the heating means provides uniform heating to the two temperature sensing elements when no acceleration or inclination is applied to the enclosure.

3. The device of claim 2, wherein at least one temperature sensing element is a wire.

4. The device of claim 1, wherein when the enclosure is subjected to a linear acceleration or inclination, a temperature differential is created between the temperature sensing elements due to a change in convection within the enclosure.

5. The device of claim 1, wherein the heating means further comprises an additional heating element for minimizing the effect of environmental temperature changes.

6. The device of claim 5, wherein when the enclosure is subjected to acceleration or inclination, a temperature differential is created between the temperature sensing elements due to a change in convection within the enclosure.

7. The device of claim 5, further comprising mounting means for mounting the temperature sensing elements, wherein the circuit means is connected to the temperature sensing elements by the mounting means.

8. The device of claim 1, further comprising mounting means for mounting the heating means within the enclosure, and wherein the heating means is configured so that free convection in the enclosure prevails over conduction of heat through the mounting means.

9. The device of claim 1, wherein the temperature sensing elements are positioned within the enclosure at a sufficient distance from the enclosure so that free convection in the enclosure prevails over radiation of heat through the enclosure.

10. The device of claim 1, wherein the fluid is a gas having desirable convective heat transfer characteristics.

11. The device of claim 10, wherein the gas includes at least one of nitrogen, helium, argon, xenon, neon and krypton.

12. The device of claim 1, further comprising two arc shaped temperature sensing elements.

13. The device of claim 1, wherein the at least one temperature sensing element is a coiled filament.

14. The device of claim 1, further comprising signal conditioning electronics for performing output voltage amplification.

15. The device of claim 1, further comprising a constant current source for providing electric power to the temperature sensing elements.

16. The device of claim 1, further comprising a second device for sensing acceleration, position, velocity or inclination having at least one temperature sensing element and positioned perpendicular to the device for sensing acceleration, position, velocity or inclination.

17. The device of claim 1, further comprising signal conditioning electronics for performing temperature compensation.

18. The device of claim 1, further comprising signal conditioning electronics for performing frequency response modification.

19. A device for sensing acceleration or inclination comprising:

a hermetically sealed enclosure containing a fluid;

heating means for heating the fluid in the enclosure;

at least two parallel temperature sensing elements having first and second ends, said temperature sensing elements mounted within said enclosure such that the fluid moves across the sensing elements in free convection; and circuit means connected to the first and second ends of the temperature sensing elements for determining at least one of acceleration and inclination based on the difference in temperature between the temperature sensing elements resulting from the effect of acceleration on free convective flow within the enclosure, wherein the heating means are the at least two temperature sensing elements.

20. A device for sensing acceleration, position, velocity or inclination comprising:

heating means for heating a fluid in an area surrounding the heating means;

two parallel temperature sensing elements positioned such that the fluid heated by the heating means moves across the two temperature sensing elements in free convection; and circuit means connected to the temperature sensing elements for determining acceleration, position, velocity or inclination based on the effect of acceleration on the free convection of the fluid in the area surrounding the heating means, wherein the heating means are the two temperature sensing elements.

21. A method for measuring acceleration or inclination comprising:

providing an enclosure containing a fluid, two parallel temperature sensing elements and a heating means;

heating the fluid within the enclosure with the heating means, wherein the heating means are the two temperature sensing elements;

subjecting the enclosure to acceleration or inclination; and determining the acceleration or inclination of the enclosure by measuring a change in the temperature of the temperature sensing element, wherein the change in the temperature is caused by changes in the free convective flow within the enclosure due to the force of acceleration on the enclosure.

22. The method of claim 21, further comprising uniformly heating the two temperature sensing elements by free convection within the enclosure when the enclosure is not subject to the acceleration or inclination and wherein subjecting the enclosure to acceleration or inclination causes a change in free convection within the enclosure and a change in heating of the two temperature sensing elements.

* * * * *

UNITED STATES PATENT AND TRADEMARK OFFICE
CERTIFICATE OF CORRECTION

PATENT NO. : 5,581,034

DATED : December 3, 1996

INVENTOR(S) : Ricardo E. Dao, Denny E. Morgan, Harold H. Kries, Donald M. Bachelder It is certified that error appears in the above-identified patent and that said Letters Patent is hereby corrected as shown below:

On the title page, item [75]:
In the inventors, delete "David M. Bachelder" and insert --Donald M. Bachelder--.

Signed and Sealed this

Twenty-third Day of December, 1997

Attest:

BRUCE LEHMAN

Attesting Officer

Commissioner of Patents and Trademarks